United States Patent [19]

Brosher et al.

[11] Patent Number: 5,084,979
[45] Date of Patent: Feb. 4, 1992

[54] FRONT AXLE TOE-IN PROCESS AND APPARATUS

[75] Inventors: Paul L. Brosher, Hilliard; David R. LeBeau, Milford Center, both of Ohio; Dallas Shuck, Fountain Hills, Ariz.

[73] Assignee: Dana Corporation, Toledo, Ohio

[21] Appl. No.: 529,135

[22] Filed: May 25, 1990

[51] Int. Cl.$^5$ ............................................. G01B 7/315
[52] U.S. Cl. ..................................... 33/193; 33/203.18
[58] Field of Search ............... 33/203, 203.18, 203.19, 33/203.2, 707, 193

[56] References Cited

U.S. PATENT DOCUMENTS

| | | | |
|---|---|---|---|
| 534,820 | 2/1895 | Doane | 33/193 |
| 550,061 | 11/1895 | Simpson | 33/193 |
| 806,682 | 12/1905 | Kurt | 33/193 |
| 1,206,476 | 11/1916 | Snyder | 33/203.2 |
| 1,330,404 | 9/1973 | Marsh et al. | |
| 1,670,889 | 5/1928 | Hartell | 33/193 |
| 1,822,599 | 9/1931 | Monk | 33/193 |
| 1,908,317 | 5/1933 | Cadwell et al. | |
| 1,922,344 | 8/1933 | Bagge | |
| 2,003,188 | 5/1935 | Heid | 33/203.20 |
| 2,235,383 | 3/1941 | O'Donnell | 33/193 |
| 2,616,186 | 11/1952 | Shooter et al. | |
| 2,619,731 | 12/1952 | Zenz, Sr. | |
| 2,704,894 | 3/1955 | Rogers | 33/203 |
| 2,793,736 | 5/1957 | Thomson | |
| 2,907,115 | 10/1959 | Bender | |
| 3,182,405 | 5/1965 | Taylor | |
| 3,409,991 | 11/1968 | Davis et al. | |
| 3,417,479 | 12/1968 | Hirmann | |
| 3,566,476 | 3/1971 | McWhorter | |
| 3,892,042 | 7/1975 | Senften | |
| 3,977,067 | 8/1976 | LaValley | |
| 4,037,325 | 7/1977 | Weber et al. | 33/707 |
| 4,138,825 | 2/1979 | Pelta | 33/203.18 |
| 4,192,074 | 3/1980 | Chang | |
| 4,236,315 | 12/1980 | Curchod et al. | |
| 4,615,618 | 10/1986 | Bailey et al. | |

Primary Examiner—Thomas B. Will
Attorney, Agent, or Firm—William J. Clemens

[57] ABSTRACT

An apparatus for setting the toe-in for a vehicle front axle assembly includes a fixture having a pair of clamps for engaging the axle spindles. The fixture is adjustable to accommodate different length axles and one of the clamps is rotatable to accommodate the toe-in setting. A position indicator is attached to one of the clamps and a position sensor is attached to the other clamp for generating an indication of the toe-in setting. The position indicator can be an arc arm attached to the rotatable clamp with a head having indicator marks thereon and the position sensor can be an optical sensor for reading the marks.

17 Claims, 3 Drawing Sheets

FRONT AXLE TOE-IN PROCESS AND APPARATUS

BACKGROUND OF THE INVENTION

The present invention relates generally to a process and an apparatus for setting the toe-in of vehicle wheels and, in particular, to a process and apparatus for setting the toe-in on a vehicle front axle assembly during manufacture.

Toe in and toe-out are defined as the distance between the front edges of the front wheels of a vehicle being shorter and longer respectively than the distance between the rear edges of those wheels. Vehicle front wheels are typically adjusted to a toe-in position. In the past, vehicle front wheel toe-in settings have been performed by a variety of methods. Initially, mechanical devices were attached to the spindles, wheel rims or brake backing plates for the measurement of the toe-in or toe-out. For example, an elongated paddle extending in a horizontal direction was attached to each of the axle spindles. Separate length measurements were taken at the front ends of the paddles and at the rear ends of the paddles using a tape measure and the difference between these two measurements was the toe-in or toe-out setting.

Another prior art method involved engaging the spindle or rim of each front wheel and measuring the angular deviation from a line parallel to the longitudinal axis of the vehicle with a mechanical linkage and pointer. In one such device, the pointer was replaced by a potentiometer for generating an electrical signal representing the measured angle.

Alternatively, the wheel rim or spindle was engaged by a level or inclination detector utilizing liquid or air to support an indicator of toe-in or toe-out of the wheels. In one form, electrodes were immersed in the liquid to generate electrical signals indicating the angle with respect to the wheel. Other prior art devices engaged the wheels with mechanical linkages coupled to mirrors for sighting reference lines or reflecting light beams.

Since the front wheel toe in influences the steering stability and riding qualities of a vehicle and has a direct effect on tire wear, it is important to properly set the toe-in on an axle assembly line before the axle is installed in the vehicle. However, most of the devices and methods described above lack the necessary close tolerance required for current axle assembly procedures and may require two operators. Furthermore, since pointers, level detectors and line of sight techniques are utilized in those devices, the operator's judgement as to when correct alignment has been achieved is relied upon. One attempt to solve the above-identified problems in an axle assembly line involved an apparatus which referenced from the brake backing plate mounting surfaces of a front axle assembly for sensing and indicating whether the assembly, including an I-beam type front axle and a tie rod, initially has too much or too little toe-in, with provisions for sensing and indicating any change thereto resulting from manual manipulation of the tie rod. Such an apparatus was lowered by an operator onto the spindles of a front axle assembly, slid inwardly along the spindles and clamped against the oppositely disposed brake backing plate mounting surfaces. Air sensing means sensed the actual toe-in relationship between the two mounting surfaces, and visual indicators displayed such toe- in relationship to the operator. As the operator rotated the tie rod, the changes in the angular positions of the backing plates were conveyed to the operator through the display.

One disadvantage of the last described device is that after it is lowered into position over the spindles, clamping mechanisms must be slid into place and clamped on the brake backing plates before measurements can be made. This process is reversed after the measurements are made in order to remove the measured axle and replace it with a new axle. Such operation tends to slow down the axle assembly production process. In addition, the measurements of toe-in are made from the brake backing surfaces. Although these surfaces are machined perpendicular to the longitudinal axis of the associated spindle, the wheel will be mounted on the outside surface of the spindle and a more accurate measurement could be made from such surface.

SUMMARY OF THE INVENTION

The present invention concerns an apparatus for indicating the toe-in setting of the wheels on an axle assembly. The apparatus includes a fixture having a pair of clamping assemblies adapted to engage axle spindles, an elongated frame member having one of the clamping assemblies fixedly attached to an outer end thereof, and a pivot bracket having the other one of the clamping assemblies pivotally attached thereto. The frame member and the pivot bracket are coupled for relative movement to accommodate different length axles.

An arc arm is coupled for co-rotation with the pivotally mounted clamping assembly and a position indicator is mounted on the arc arm and has a plurality of indicator marks formed thereon. A position sensor is mounted on the frame member for reading the indicator marks whereby when the clamping assemblies engage a pair of axle spindles of a vehicle axle, the position sensor generates a signal to a data processor and a control panel which indicates a toe-in setting of the spindles.

The invention also concerns a process for indicating the toe-in setting. When the toe-in setting of an axle is to be checked, the distance between the clamping assemblies is adjusted to accommodate the axle length and the position sensor and the position indicator are positioned at the center of the fixture. The fixture is held in a raised position with the clamping assemblies open. The axle to be checked is positioned beneath the fixture and the fixture is lowered until the axle spindles engage the jaw pads of the clamping assemblies. The clamping assemblies are closed forcing relative rotation between the frame member and the arc arm. The sensor reads the indicator marks on the position indicator and generates a signal to the data processor which converts the signal to a visual display of the actual value of the toe-in setting at the control panel. If the actual value does not correspond to the desired value, the tie rod is adjusted until the desired value is displayed. The tie rod adjustment means is then clamped in place to preserve the toe-in setting. The clamping assemblies are released and the fixture is raised clear of the axle which is removed. The fixture is ready to receive the next axle to be checked.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
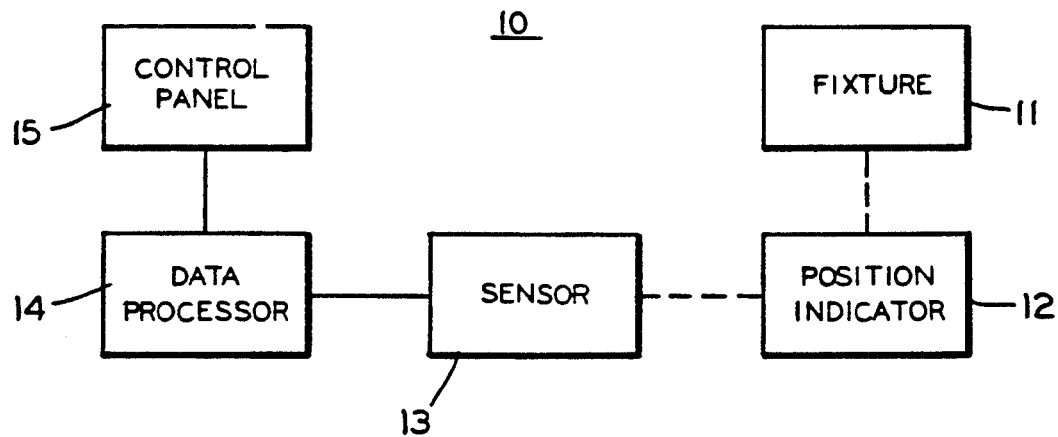
FIG. 1 is a block diagram of an apparatus for performing a process of setting vehicle axle toe-in in accordance with the present invention.

As shown in FIG. 1, an apparatus 10 for indicating the toe-in of a vehicle front axle in accordance with the present invention includes a fixture 11 for engaging a front axle (not shown) and an associated toe-in position indicator 12. The position indicator 12 is coupled to the spindles of the front axle through the fixture 11 to provide a mechanical indication of the value of the toe in setting. The mechanical indication of the position indicator 12 is read by a sensor 13 which generates an electrical output signal representing the value of the toe in setting. The signal from the sensor 13 is an input to a data processor 14 which is connected to a control panel 15 for use by an operator for reading the actual toe-in value and for setting the desired toe-in value.

Figure 3:
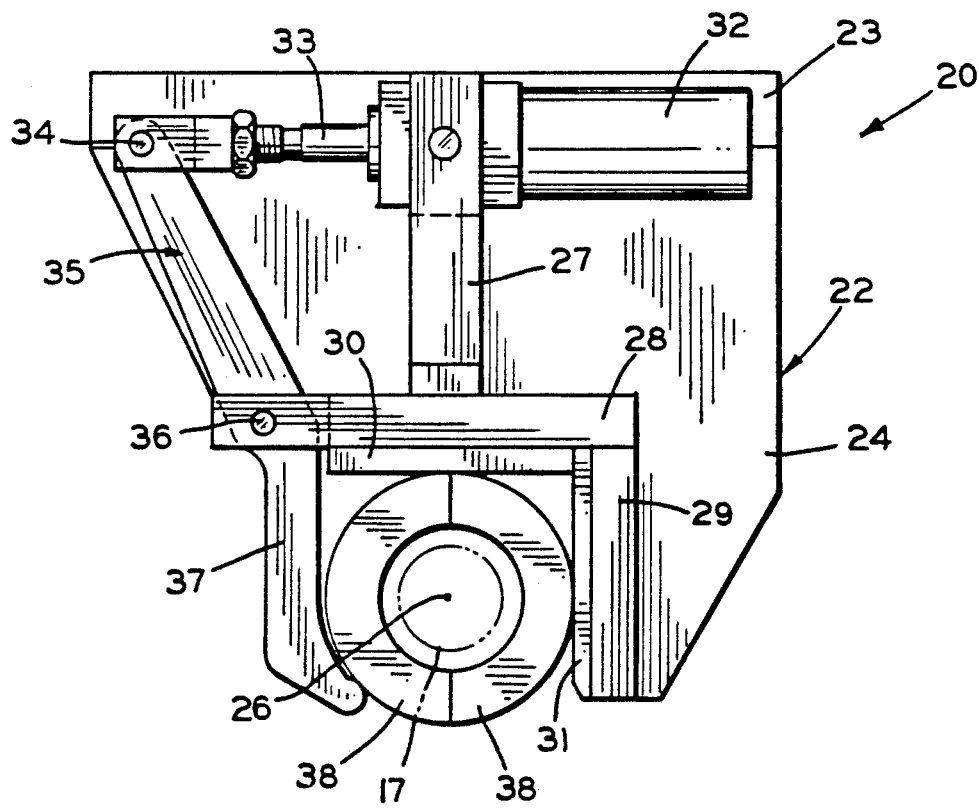
FIG. 3 is an enlarged right side elevational view of the apparatus as if taken along the line 3—3 in FIG. 2.
Figure 2:
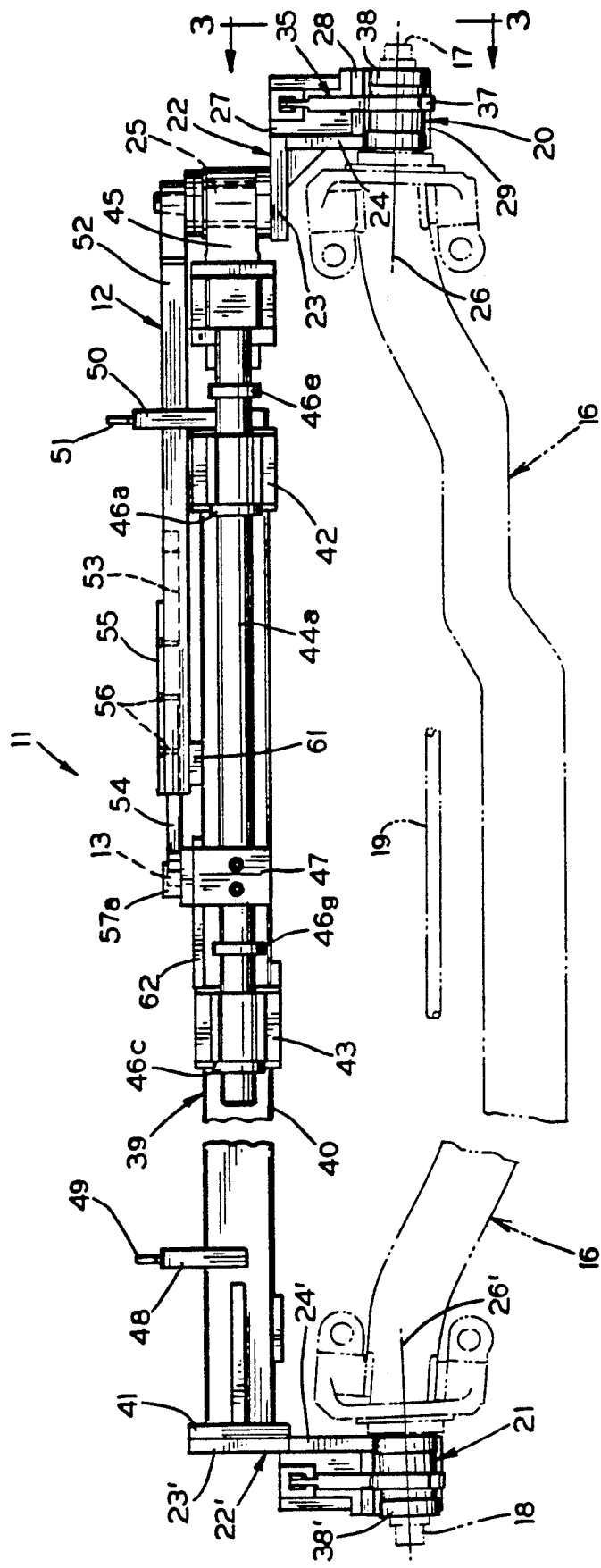
FIG. 2 is a front elevational view of the fixture, position indicator and sensor portions of the apparatus shown in FIG. 1.

A portion of the apparatus 10 including the fixture 11, the position indicator 12 and the sensor 13 is shown in FIG. 2 with a vehicle front axle 16 in phantom so as not to obscure the invention. The axle 16 is viewed from behind, as if from the rear of a vehicle, and attached to opposite ends of the axle 16 are a right end spindle 17 and a left end spindle 18 for mounting a pair of wheels (not shown). The spindles 17 and 18 are connected to a tie rod 19 (fragmentary view) for adjusting the value of the toe-in setting. The right spindle 17 can be engaged by a right clamping assembly 20, also shown in FIG. 3, and the left spindle 18 can be engaged by a left clamping assembly 21, the clamping assemblies 20 and 21 being included in the fixture 11. As shown in FIGS. 2 and 3, the right clamping assembly 20 includes an inverted generally L-shaped bracket 22 having a generally horizontally extending, planar leg 23 attached to a generally vertically extending, planar leg 24. An inwardly facing end of the leg 23 is fixedly attached to a lower end of a generally vertically extending shaft 25 for pivotal movement as described below.

The leg 24 extends in a plane which is generally perpendicular to a longitudinal axis 26 of the spindle 17. Attached to an outer surface of the leg 24 is an actuator mounting plate 27 which extends in a generally vertical plane which includes the longitudinal axis 26. Also extending outwardly from the leg 24 is a generally horizontally extending clamping arm mounting plate 28 and a generally vertically extending fixed jaw plate 29. The bracket 22, and the plates 27, 28 and 29, are typically formed of a strong metal material such as steel. Replaceable jaw pads 30 and 31, also formed of steel, are attached to the surfaces of the plates 28 and 29 respectively which face the spindle 17 by any suitable means such as threaded fasteners (not shown).

Attached to the mounting plate 27 is an actuator 32, typically a pneumatic cylinder from which extends an actuating rod 33. A free end of the rod 33 is pivotally connected at a point 34 to an upper end of a movable clamp arm 35. The arm 35 has a central portion pivotally attached to the clamping arm mounting plate 28 at a point 36. A lower end of the arm 35 forms a moveable jaw 37 which cooperates with the fixed jaw 29 and the clamping arm mounting plate 28 to secure the spindle 17.

When the spindle 17 is to be clamped, a split bushing 38 is placed about the outer surface of the spindle 17. The rod 33 is retracted into the cylinder of the actuator 32 pivoting the arm 35 about the pivot point 36 and moving the moveable jaw 37 away from the spindle 17. The fixture 11 with the right clamp assembly 20 can then be lowered over the spindle 17 and split bushing 38 until the upper outer surface of the split bushing 38 contacts the liner 30. The actuator 32 is activated to extend the rod 33 thereby rotating the arm 35 and bringing the moveable jaw 37 into contact with the split bushing 38 until the split bushing 38 and the spindle 37 are firmly clamped between the moveable jaw 37 and the liner 31 of the fixed jaw plate 29. The left clamping assembly 21 is similar to the right clamping assembly 20 and operates in a similar manner to firmly clamp the left end spindle 18 in a split bushing 38'.

The clamping assemblies 20 and 21 are attached to opposite ends of a variable length frame 39. The frame 39 includes a generally horizontally extending, elongated box section frame member 40. Attached to a left end of the member 40 is a generally vertically extending mounting plate 41. The left clamping assembly 21 includes a bracket 22' similar to the bracket 22 described above with the exception that a leg 23' extends in a generally vertical direction in the same plane as a vertically extending leg 24' which is similar to the leg 24. The leg 24' extends in a plane which is generally perpendicular to a longitudinal axis 26' of the spindle 18. The leg 23' is attached to the mounting plate 41 by any suitable means such as threaded fasteners (not shown).

Figures 4, 5, 6:
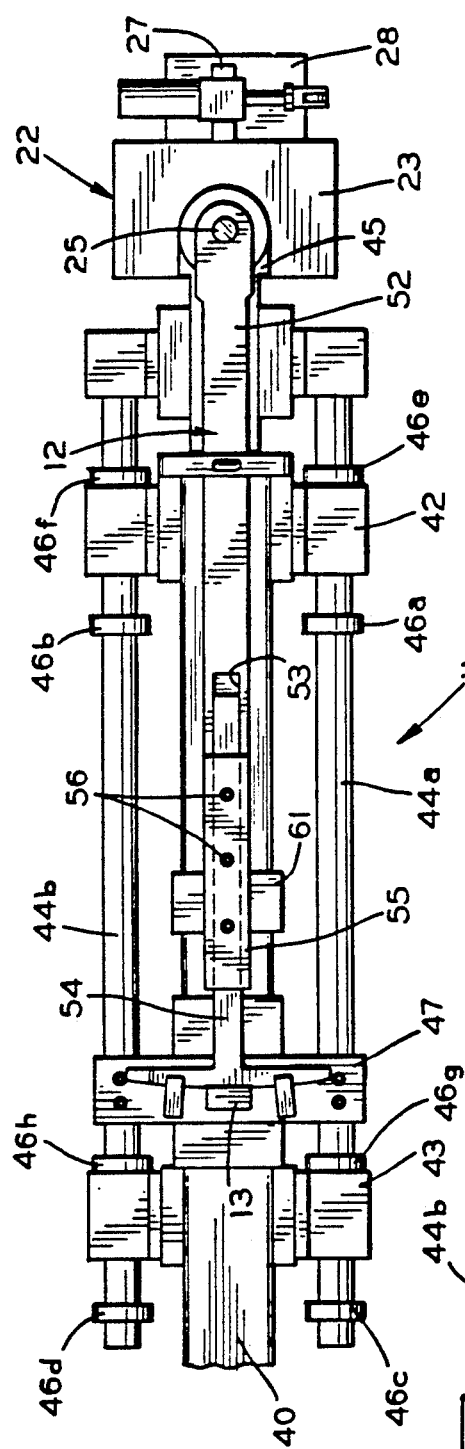
FIG. 4 is a fragmentary top plan view of the right end portion of the apparatus shown in FIG. 2.
FIG. 5 is a enlarged fragmentary top plan view of the sensor portion of the apparatus shown in FIG. 4.
FIG. 6 is an enlarged fragmentary left side elevational view of the position indicator shown in FIG. 5.

As shown in FIGS. 2 and 4, attached to the right end of the frame member 40 is a sleeve bearing mounting bracket 42, and spaced from the bracket 42 and attached to the member 40 is a second sleeve bearing mounting bracket 43. A pair of rods 44a and 44b are positioned in front of and behind the member 40 respectively, each of the rods 44a and 44b having a longitudinal axis extending generally parallel to the longitudinal axis of the member 40. A right end of each of the rods 44a and 44b is attached to a pivot bracket 45 in which the shaft 25 is rotatably mounted. The rods 44a and 44b slidably extend through both of the mounting brackets 42 and 43 thereby forming a Thompson bearing assembly to permit variance of the horizontal distance between the right clamp assembly 20 and the left clamp assembly 21 in order to accommodate different lengths of axles. In FIG. 2, the fixture 11 is shown in the widest or fully extended position with stop means 46a and 46c mounted on the rod 44a and abutting the left side of each of the mounting brackets 42 and 43 respectively. Corresponding stops 46b and 46d are attached to the rod 44b as shown in FIG. 4. In FIG. 4, the fixture 11 is shown in the narrowest or fully closed position with stop means 46e and 46g mounted on the rod 44a and abutting the right side of each of the mounting brackets 42 and 43 respectively. Corresponding stops 46f and 46h are attached to the rod 44b. A support 47 for the sensor 13 is positioned adjacent the stops 46g and 46h and includes sleeve bearings (not shown) for coupling to the rods 44a and 44b as described below.

As best shown in FIG. 2, the fixture 11 includes means for lowering toward and raising away from the axle 16. The axle 16 can be supported from below by any suitable means (not shown) permitting positioning under the fixture 11 which is shown in the lowered position. A support bracket 48 is attached to the member 40 adjacent the left end and an eye bolt 49 is attached to and extends upwardly from the bracket 48. Similarly, a support bracket 50 is attached to the member 40 at the mounting bracket 42 and an eye bolt 51 is attached to and extends upwardly from the bracket 50. The eye bolts 49 and 51 provide locations for attaching a hoist (not shown) to raise and lower the fixture 11.

The position indicator 12 and the sensor 13 of FIG. 1 are shown in more detail in FIGS. 2, 4 and 5. The position indicator 12 includes an arc arm 52 having a right end fixedly attached to an upper end of the shaft 25. Thus, as the shaft 25 pivots in the pivot bracket 45, the arc arm 52 maintains a fixed relationship with respect to the right clamping assembly 20 indicating the angle between the longitudinal axis 26 of the spindle 17 and the longitudinal axis 26' of the spindle 18 in a horizontal plane. The opposite end of the arm 52, the left end, has a longitudinally extending, upwardly facing slot 53 formed therein. Extending into the open end of the slot 53 is a generally T-shaped position indicator arm 54. The arm 54 is retained in the slot 53 by a cover plate 55 attached to the upper surface of the arm 52. When the left or head end of the arm 54 is moved to a position adjacent the sensor 13, one or more set screws 56 threadably retained in the cover plate 55 can be screwed into engagement with an upper surface of the indicator arm 54 to lock it in place.

Mounted on an upper surface of the support 47 is the sensor 13 and a pair of guide blocks 57a and 57b. A head 58 of the indicator arm 54 has a generally vertically extending end surface 59 which defines an arc in a horizontal plane at a radius extending from the pivot axis of the shaft 25. The sensor 13 is generally positioned along the longitudinal axis of the member 40 adjacent the path of travel of the curved surface 59. The guide blocks 57a and 57b are spaced from the sensor 13 on either side thereof and each of the guide blocks, 57a and 57b, has a generally horizontally extending flange, 60a and 60b respectively, formed thereon which extends over the upper surface of the head 58. Thus, the head 58 is positioned between an upper surface of the support 47 and the lower surfaces of the flanges 60a and 60b. Mounted on an upper surface of the member 40 between the mounting bracket 42 and the support 47 is a bearing block 61. The bearing block 61 slidably supports the left end of the arc arm 52 for pivotal movement and also supports the head 58 spaced from the upper surface of the support 47 and the lower surfaces of the flanges 60a and 60b.

The support 47 rests on a bearing block 62 which is attached to the upper surface of the frame member 40. The sensor 13 and the head 58 must be positioned half way between the clamping assemblies 20 and 21 to provide an accurate indication of toe-in. Therefore, when the distance between the clamping assemblies is changed, the support 47 is released, repositioned along the rods 44a and 44b, and reclamped. The arm 54 also must be moved by loosening the screws 56, sliding the arm 54 in the slot 53, and retightening the screws 56.

In FIG. 2, if we assume that the rear side of the axle 16 is facing us, a toe-in setting will be indicated when the head 58 of the indicator arm 54 is shifted from a position shown in FIG. 5 in a counter clockwise direction as shown by an arrow 63. Conversely, a toe-out setting would be indicated by the head 58 shifting in a clockwise direction from the position shown in FIG. 5. In FIG. 6, there is shown an enlarged fragmentary front elevational view of the curved surface 59 of the head 58. Mounted on the surface 59 and extending in a generally horizontal direction is a suitable indicia means 64 such a metallic tape formed of a gold material. The tape 64 has indicia in the form of a plurality of generally vertically extending optically readable indicator marks formed therein. For example, an indicator mark 65 can represent a zero point wherein the longitudinal axis of the indicator arm 54 is aligned with the longitudinal axis of the member 40. If an axle were clamped in the fixture 11, such a position would indicate that the longitudinal axis of each of the associated spindles was aligned with the longitudinal axis of the axle for a zero or no toe-in or toe-out setting.

Equally spaced from and on opposite sides of the mark 65 are positioned a pair of indicator marks 66 and 67. If the right clamping assembly 20 has been rotated in a clockwise direction with respect to the left clamping assembly 21, such that the mark 66 is aligned with the center of the sensor 13, a toe-out setting is indicated and the mark 66 represents a predetermined value of toe-out. Conversely, if the clamping assembly 20 is rotated in a counter clockwise direction with respect to the clamping assembly 21, and the mark 67 is aligned with the center of the sensor 13, a toe-in setting is indicated in a predetermined amount. For example, the marks 66 and 67 can each represent one degree of toe-out and toe in respectively. Of course, any number of the marks can be provided as required to indicate the maximum settings utilized and the marks can be spaced closer together or farther apart representing increments other than one degree. Furthermore, the sensor 13 and the tape 64 are representative of any suitable angular position indicating means and the sensor 13 could be mounted on the head 58 and the tape 64 mounted on the support 47.

When the toe-in setting of an axle is to be checked, the distance between the clamping assemblies 20 and 21 is adjusted to accommodate the axle length and the sensor 13 and the head 58 are positioned at the center of the fixture 11. The fixture 11 is held in a raised position with the clamping assemblies 20 and 21 open. The axle to be checked is positioned beneath the fixture 11 and the fixture is lowered until the axle spindles engage the jaw pads of the clamping assemblies. The clamping assemblies are closed forcing relative rotation between the frame member 40 and the arc arm 52. The sensor 13 reads the indicator marks on the head 58 and generates a signal to the data processor 14 which converts the signal to a visual display of the actual value of the toe-in setting at the control panel 15. If the actual value does not correspond to the desired value, the tie rod is adjusted until the desired value is displayed. The tie rod adjustment means is then clamped in place to preserve the toe in setting. The clamping assemblies are released and the fixture 11 is raised clear of the axle which is removed. The fixture 11 is ready to receive the next axle to be checked.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for indicating the toe-in setting of a pair of axle spindles on a vehicle front axle assembly comprising:
   a pair of clamps adapted to engage axle spindles, each of said clamps including a fixed jaw and a selectively moveable jaw for engaging and disengaging a spindle and an actuator connected to said moveable jaw for moving said moveable jaw toward and away from said fixed jaw;
   an elongated frame member having one of said clamps attached to an outer end thereof;
   a pivot bracket connected to said frame member and having the other one of said clamps pivotally attached thereto;
   an arc arm connected for co-rotation with said other clamp; and
   one of a position indicator and a position sensor mounted on said frame member and the other of said position indicator and said position sensor mounted on said arc arm whereby when said clamps engage a pair of axle spindles of a vehicle axle, a position of said position indicator with respect to said position sensor indicates a toe-in setting of the spindles.

2. The apparatus according to claim 1 including means connecting said frame member with said pivot bracket for relative movement along a longitudinal axis to selectively space said clamps to accommodate different length axles.

3. The apparatus according to claim 1 wherein said position indicator is mounted on said arc arm and said position sensor is mounted on said frame member.

4. The apparatus according to claim 1 wherein said position indicator has a plurality of indicator marks formed thereon and said position sensor is responsive to said marks for generating a signal representing the toe-in setting of the spindles.

5. The apparatus according to claim 4 wherein said position sensor is an optical sensor.

6. The apparatus according to claim 4 wherein each of said marks represents one degree of rotation of said arc arm.

7. The apparatus according to claim 4 wherein said position sensor is an optical sensor and said marks are formed on a gold tape attached to said position indicator.

8. The apparatus according to claim 1 wherein said position sensor generates a signal representing the toe-in setting of the spindles and including a data processor connected to said sensor and a control panel connected to said data processor, said data processor being responsive to said signal for generating a visual indication of the value of the toe-in setting at said control panel.

9. An apparatus for indicating the toe-in setting of a pair of axle spindles on a vehicle front axle assembly comprising:
   a pair of clamping assemblies adapted to engage axle spindles, each of said clamping assemblies including a fixed jaw and a selectively moveable jaw for engaging and disengaging a spindle and an actuator connected to said moveable jaw for moving said moveable jaw toward and away from said fixed jaw;
   an elongated frame member having one of said clamping assemblies fixedly attached to an outer end thereof;
   a pivot bracket attached to said frame member and having the other one of said clamping assemblies pivotally attached thereto;
   an arc arm coupled for co-rotation with said other clamping assembly;
   a position indicator mounted on said arc arm and having a plurality of indicator marks forward thereon; and
   a position sensor mounted on said frame member for reading said indicator marks whereby when said clamping assemblies engage a pair of axle spindles of a vehicle axle, said position sensor indicates a toe-in setting of the spindles.

10. The apparatus according to claim 9 including means connecting said frame member with said pivot bracket for relative movement along a longitudinal axis to selectively space said clamping assemblies to accommodate different length axles.

11. The apparatus according to claim 9 wherein said position indicator has a plurality of indicator marks formed thereon and said position sensor is responsive to said marks for generating a signal representing the toe-in setting of the spindles.

12. The apparatus according to claim 11 wherein said position sensor is an optical sensor and said marks are formed on a gold tape attached to said position indicator.

13. The apparatus according to claim 9 wherein said position sensor generates a signal representing the toe-in setting of the spindles and including a data processor connected to said sensor and a control panel connected to said data processor, said data processor being responsive to said signal for generating a visual indication of the value of the toe-in setting at said control panel.

14. A method of setting a toe-in value for a vehicle front axle comprising the steps of:
   a. providing a fixture having a pair of clamping assemblies, a position indicator attached to one of the clamping assemblies and a position sensor attached to the other one of the clamping assemblies, each of the clamping assemblies including a fixed jaw and a selectively moveable jaw for engaging and disengaging a spindle and an actuator connected to the moveable jaw for moving the moveable jaw toward and away from the fixed jaw;
   b. closing the clamping assemblies by actuating the actuators to move the moveable jaws toward the fixed jaws to engage the spindles of an axle and force relative rotation between the clamping assemblies; and
   c. generating a signal from the position sensor representing the position of the position indicator and the toe-in setting of the spindles.

15. The method according to claim 14 including generating said signal to a data processor and converting said signal to a visual display of the actual value of the toe-in setting.

16. The method according to claim 15 including adjusting a tie rod associated with the spindles until said visual display corresponds to a desired value of toe-in.

17. The method according to claim 14 wherein the position indicator has a plurality of indicator marks formed thereon and the position sensor is an optical sensor responsive to said marks for generating said signal and wherein said step a. is performed by attaching the position sensor to a fixed one of the clamping assemblies and attaching the position indicator to a rotatable one of the clamping assemblies.

* * * * *